(12) United States Patent
Blumke et al.

(10) Patent No.: US 6,766,877 B2
(45) Date of Patent: Jul. 27, 2004

(54) TEAR AWAY BRACKET

(75) Inventors: Amanda Blumke, Shelby Township, MI (US); Kevin Kaplan, Macomb Township, MI (US); Ramon Kuczera, Clarkston, MI (US); Michael Rice, Clarkston, MI (US); Mary Yonka, Lake Orion, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 10/179,880

(22) Filed: Jun. 24, 2002

(65) Prior Publication Data

US 2003/0234134 A1 Dec. 25, 2003

(51) Int. Cl.[7] ............................................... B60K 17/02
(52) U.S. Cl. ................... 180/379; 180/377; 180/378; 180/380
(58) Field of Search ............................... 180/379, 377, 180/378, 380

(56) References Cited

U.S. PATENT DOCUMENTS

| 5,244,053 A | * | 9/1993 | Kashiwagi | 180/377 |
| 5,454,453 A | * | 10/1995 | Meyer et al. | 180/377 |
| 6,213,245 B1 | * | 4/2001 | Murata et al. | 180/377 |

* cited by examiner

*Primary Examiner*—M. Thomson
(74) *Attorney, Agent, or Firm*—Mick A. Nylander

(57) ABSTRACT

A crash optimized bracket for removably affixing a propeller shaft to a motor vehicle. The bracket includes an elongated member having a plurality of weakened slots to allow the bracket and the propeller shaft to tear from the vehicle upon impact in a controlled and predictable manner in response to predetermined loads.

9 Claims, 20 Drawing Sheets

TEAR AWAY BRACKET

TECHNICAL FIELD

The present invention relates to a drive system for a motor vehicle and, more specifically, to a crash optimized bracket for removably affixing a propeller shaft to A motor vehicle.

BACKGROUND ART

There are generally four (4) main types of automotive drive line systems. More specifically, there exists a full-time front wheel drive system, a full-time rear wheel drive system, a part-time four wheel drive system, and an all-wheel drive system. Most commonly, the systems are distinguished by the delivery of power to different combinations of drive wheels, i.e., front drive wheels, rear drive wheels or some combination thereof. In addition to delivering power to a particular combination of drive wheels, most drive systems permit the respectively driven wheels to rotate at different speeds. For example, the outside wheels must rotate faster than the inside drive wheels, and the front drive wheels must normally rotate faster than the rear wheels.

Drive line systems also include one or more Cardan (Universal) and Constant Velocity joints (CVJ's). Cardan joints are the most basic and common joint type used, for example, on propshafts. Although highly durable, Cardan joints are typically not suited for applications with high angles (e.g. >2 degrees) because of their inability to accommodate constant velocity rotary motion. Constant Velocity joints, in contrast, are well known in the art and are employed where transmission of a constant velocity rotary motion is desired or required. For example, a tripod joint is characterized by a bell-shaped outer race (housing) disposed around an inner spider joint which travels in channels formed in the outer race. The spider-shaped cross section of the inner joint is descriptive of the three equispaced arms extending therefrom which travel in the tracks of the outer joint. Part spherical rollers are featured on each arm.

One type of constant velocity universal joint is the plunging tripod type, characterized by the performance of end motion in the joint. Plunging tripod joints are currently the most widely used inboard (transmission side) joint in front wheel drive vehicles, and particularly in the propeller shafts found in rear wheel drive, all-wheel drive and 4-wheel drive vehicles. A common feature of tripod universal joints is their plunging or end motion character. Plunging tripod universal joints allow the interconnection shafts to change length during operation without the use of splines which provoke significant reaction forces thereby resulting in a source of vibration and noise.

The plunging tripod joint accommodates end wise movement within the joint itself with a minimum of frictional resistance, since the part-spherical rollers are themselves supported on the arms by needle roller bearings. In a standard ball roller type constant velocity joint the intermediate member of the joint (like the ball cage in a rzeppa constant velocity joint) is constrained to always lie in a plane which bisects the angle between the driving and driven shafts. Since the tripod type joint does not have such an intermediate member, the medium plane always lies perpendicular to the axis of the drive shaft.

Another common type of constant velocity universal joint is the plunging VL or "cross groove" type, which consists of an outer and inner race drivably connected through balls located in circumferentially spaced straight or helical grooves alternately inclined relative to a rotational axis. The balls are positioned in a constant velocity plane by an intersecting groove relationship and maintained in this plane by a cage located between the two races. The joint permits axial movement since the cage is not positionably engaged to either race. As those skilled in the art will recognize, the principal advantage of this type of joint is its ability to transmit constant velocity and simultaneously accommodate axial motion. Plunging VL constant velocity universal joints are currently used for high speed applications such as, for example, the propeller shafts found in rear wheel drive, all-wheel drive and 4-wheel drive vehicles.

The high speed fixed joint (HSFJ) is another type of constant velocity joint well known in the art and used where transmission of high speed is required. High speed fixed joints allow articulation to an angle (no plunge) but can accommodate much higher angles than with a Cardan joint or other non-CV joints such as, for example, rubber couplings. There are generally three types of high speed fixed joints: (1) disk style that bolts to flanges; (2) monoblock style that is affixed to the tube as a center joint in multi-piece propshafts; and (3) plug-on monoblock that interfaces directly to the axle or T-case replacing the flange and bolts.

A HSFJ generally comprises: (1) an outer joint member of generally hollow configuration, having a rotational axis and in its interior, a plurality of arcuate tracks circumferentially spaced about the axis extending in meridian planes relative to the axis, and forming lands between the tracks and integral with the outer joint part wherein the lands have radially inwardly directed surfaces; (2) an inner joint member disposed within the outer joint member and having a rotational axis, the inner joint member having on its exterior a plurality of tracks whose centerline lie in meridian planes with respect to the rotational axis of the inner joint member in which face the tracks of the outer joint member and opposed pairs, wherein lands are defined between the tracks on the inner joint member and have radially outwardly directed surfaces; (3) a plurality of balls disposed one in each pair of facing tracks in the outer and inner joint members for torque transmission between the members; and (4) a cage of annular configuration disposed between the joint members and having openings in which respective balls are received and contained so that their centers lie in a common plane, wherein the cage has external and internal surfaces each of which cooperate with the land surfaces of the outer joint member and inner joint member, respectively to locate the cage and the inner joint member axially.

In joints of this kind, the configuration of the tracks in the inner and outer joint members, and/or the internal and external surfaces of the cage are such that, when the joint is articulated, the common plane containing the centers of the balls substantially bisects the angle between the rotational axis of the joint members. As indicated above, there are several types of high speed fixed joints differing from one another with respect to the arrangement and configuration of the tracks in the joint members and/or to the internal and external surfaces of the cage whereby the common bisector plane is guided as described above thereby giving the joint constant-velocity-ratio operating characteristics. In each design, however, the cage is located axially in the joint by cooperation between the external cage surface and the surfaces of the lands facing the cages surface.

The outer surface of the cage and cooperating land surfaces of the outer joint member are generally spherical. When torque is transmitted by the joint, the forces acting in the joint cause the cage to be urged (by e.g. ball expulsion forces) towards one end of the joint which end will depend on the respective directions of the offsets of the tracks in the inner and outer joint members from the common plane when the joint is in its unarticulated position. To reduce the normal forces acting on the cage as a result of these ball expulsion forces, the amount of spherical wrap by the outer joint member lands is maximized for increased cage support.

In a disc-style constant velocity fixed joint, the outer joint member is open on both ends and the cage is assembled from the end opposite the end towards which the cage is urged by the ball expulsion forces under articulated load conditions. Assembly of the cage into the outer joint member is typically accomplished by either incorporating cage assembly notches into one of or a pair of lands in the outer joint member, or by sufficiently increasing the bore diameter of the outer joint part to allow the ball cage to be introduced into the outer joint part.

In a mono-block constant velocity fixed joint, also called a "mono-block high speed fixed joint", the outer joint part is a bell-shaped member having a closed end. Accordingly, the cage must be assembled from the open end of the outer joint member. To accommodate assembly of the cage into the outer joint part, the bore diameter of the outer joint part must be sufficiently increased to allow assembly and/or assembly notches must be incorporated into at least one opposing pair of the outer joint member lands to allow introduction of the cage.

A typical driveline system incorporates one or more of the above joints to connect a pair of propeller shafts (front and rear) to a power take off unit and a rear driveline module, respectively. These propeller shafts ("propshafts") function to transfer torque to the rear axle in rear wheel and all wheel drive vehicles. The propshafts are typically rigid in the axial directions and under certain circumstances, can contribute to the transfer of force down the fore-to-aft axis of the vehicle on impact, particularly in a frontal crash. Such transfer of energy can lead to high forces in the vehicle and thus high rates of acceleration for the occupants. Further, such energy can contribute to uncontrolled buckling of the propshaft itself resulting in damage to the passenger compartment or fuel tank from puncturing or the like.

Consequently, a need exists for an improved propeller shaft coupling which addresses and solves the aforementioned problems.

DISCLOSURE OF INVENTION

It is a principle object of the present invention to provide an improved bracket for removably affixing a propeller shaft to a motor vehicle.

It is a further object of the present invention to provide an improved bracket for removably affixing a propeller shaft to a motor vehicle which permits the propeller shaft to tear from the vehicle in a substantially downward direction during impact.

Still further, it is an object of the present invention to provide an improved bracket of the type discussed above which is tunable to allow a propeller shaft to decouple from a motor vehicle in a predictable manner in response to predetermined loads upon vehicle impact.

In carrying out the above objects there is provided a crash optimized bracket for removably coupling a propeller shaft or propeller shaft section center to a motor vehicle. The crash optimized bracket comprises an elongated member having a plurality of score lines or weakened slots that are preferably, but not necessarily, disposed vertically in a direction perpendicular to the length of the bracket. In a preferred embodiment, the slots are disposed in predetermined locations with predetermined weaknesses so as to allow the bracket to tear in a predictable and controlled manner in a generally downward direction upon impact. Such placement, arrangement, and weakness setting permits the bracket and thus the corresponding propeller shaft or propeller shaft section to be tuned to respond to predetermined loads.

In a preferred embodiment, the crash optimized bracket comprises a generally elongated member having a variable thickness across its length. The thickness may be greater in the middle and substantially thinner at each end. It is understood, however, that any suitable shape, length or thickness may be utilized depending upon the particular application.

These and other objects features and advantages of the present invention will become more readily apparent with reference to the following detailed description of the invention wherein like reference numerals correspond to like components.

BEST MODE FOR CARRYING OUT THE INVENTION

Figure 1:
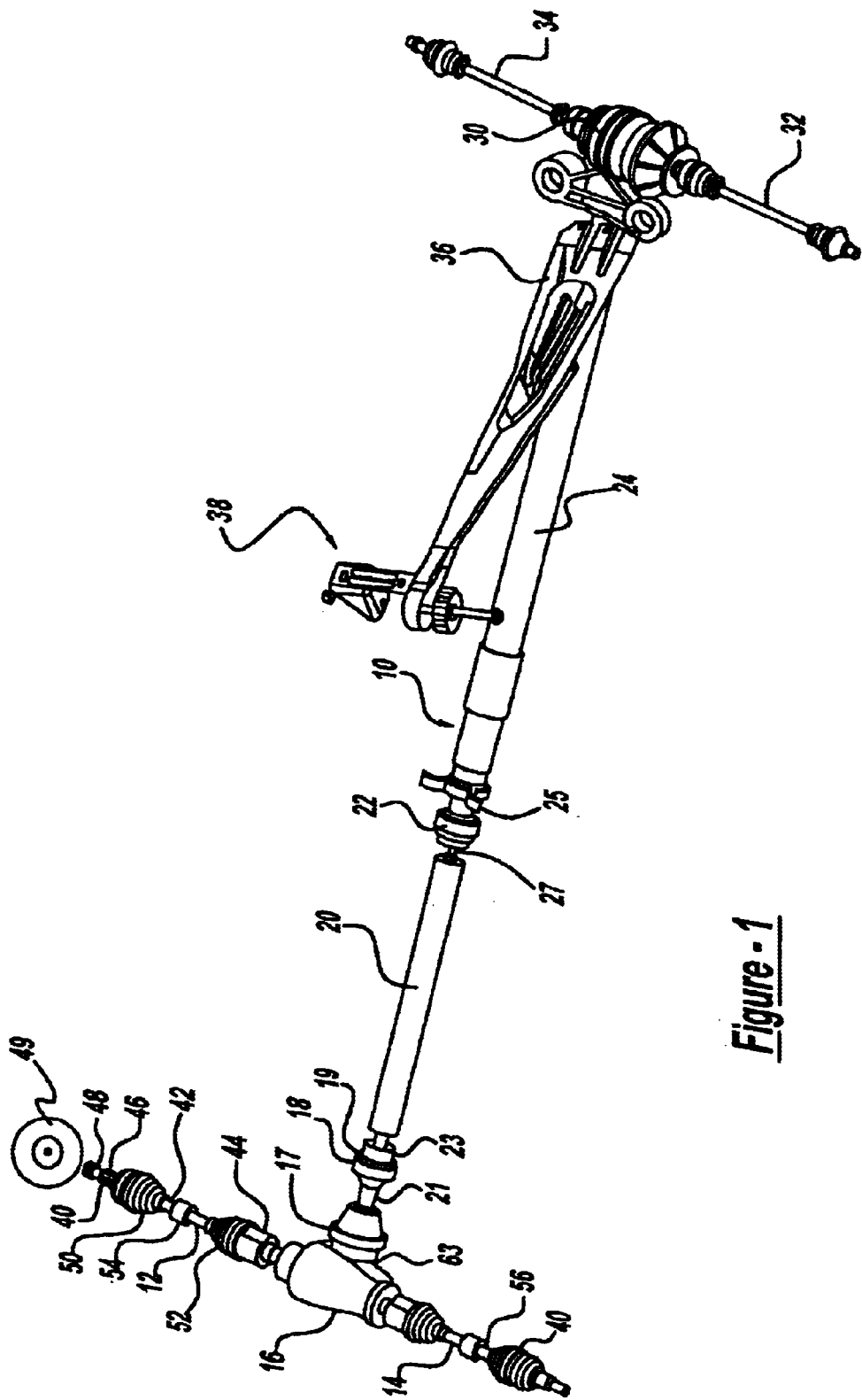
FIG. 1 is a perspective view of a representative drive system adapted to receive a propeller shaft assembly incorporating the crash optimized bracket of the present invention.
Figure 23:
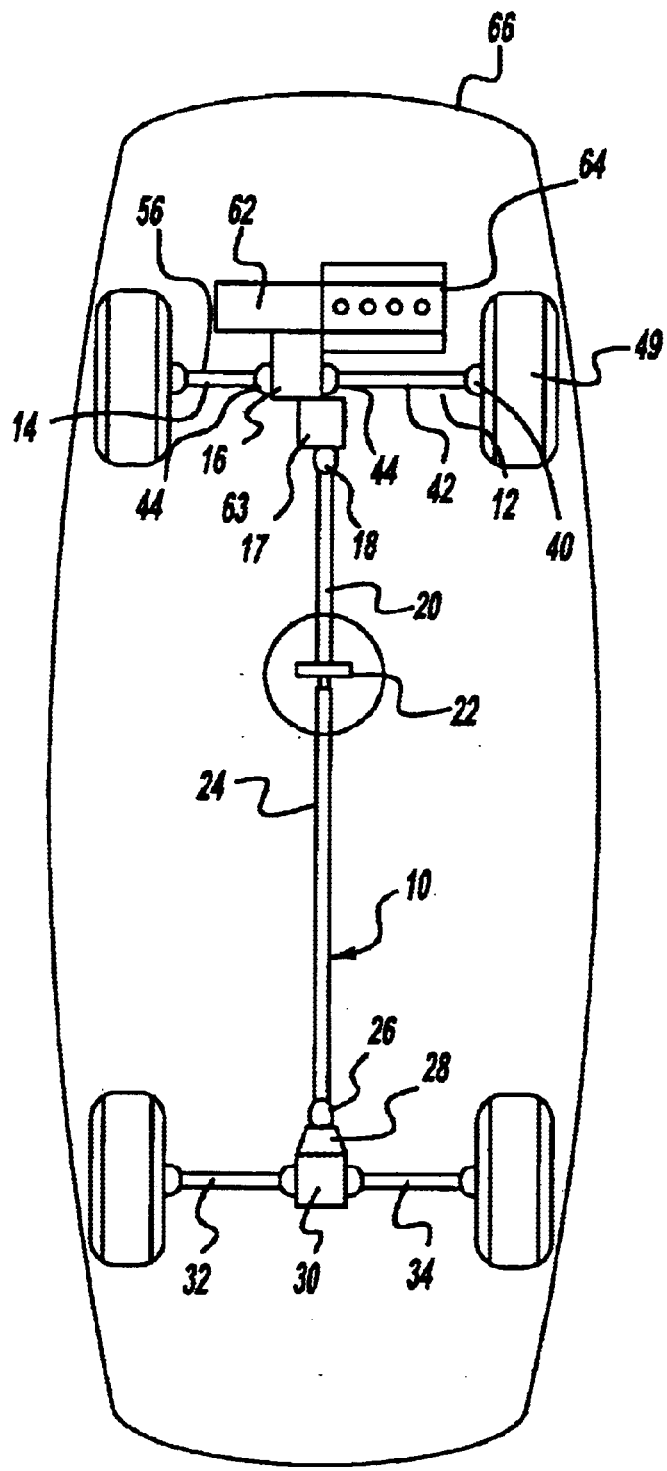
FIG. 23 is a diagrammatical depiction of a driveline system of a motor vehicle.

FIGS. 1 and 23 there is shown generally by reference numeral 10, a representative drive line system of a motor vehicle 66. Drive system 10 comprises a pair of front half shaft assemblies designated as reference numerals 12 & 14 respectively. The front half shaft assemblies 12 & 14 are operatively connected to a front differential 16. Connected to front differential 16 is a power take-off unit 17. The power take-off 17 is operatively connected to a high speed fixed joint 18. Operatively connected to high speed fixed joint 18 is a front propeller shaft (A propshaft@) assembly 20. Operatively connected to front propshaft assembly 20 is a AVL@ style plunging constant velocity joint designated as reference numeral 22. Connected to AVL@ style plunging constant velocity joint 22 is rear propshaft assembly 24. Rear propshaft assembly 24 is connected on one end to cardan joint assembly 26. Cardan joint assembly 26 may be operatively connected to a speed sensing torque device 28. Speed sensing torque transfer device 28 is operatively connected to a rear differential assembly 30. A pair of rear half shaft assemblies 32 & 34 are each connected to rear differential assembly 30. As shown in FIG. 1, attached to the rear differential assembly 30 is torque arm 36. Torque arm 36 is further connected to torque arm mount 38.

Front half shaft assemblies 12 & 14 are comprised of fixed constant velocity joints 40, a interconnecting shaft 42 and a plunge style constant velocity joint 44. Plunge style constant velocity joints 44 are operatively connected to the front differential 16. Plunge style constant velocity joints 44 are plug-in style in this embodiment. However, any style of constant velocity joint half shaft assembly may be used depending upon the application. As shown in FIG. 1, the stem portion 46 is splined such that it intereacts with a front wheel of a motor vehicle and has a threaded portion 48 which allows connection of the wheel 49 to the half shaft assembly 12.

There is also shown in FIG. 1 constant velocity joint boots 50 & 52 which are known in the art and are utilized to contain constant velocity joint grease which is utilized to lubricate the constant velocity joints. There is also shown an externally mounted dynamic damper 54 which is known in the art. U.S. Pat. No. 5,660,256 to the Assignee of the present invention is herein incorporated by reference.

Halfshaft assembly 14 may be designed generally similar to that of halfshaft assembly 12 with changes being made to the length of interconnecting shaft 56. Different sizes and types of constant velocity joint may also be utilized on the left or right side of the drive system depending on the particular application.

The power take-off unit 17 is mounted to the face of the transmission 62 and receives torque from the front differential 16. The transmission 62 is operatively connected to the engine 64 of the motor vehicle 66. The power take-off unit 17 has the same gear ratio as the rear differential 30 and drives the front propshaft 20 through the high speed fixed joint 18 at 90 degrees from the front differential axis.

Still referring to FIGS. 1 and 23, in a typical four-wheel drive vehicle, the drive is transmitted to the front and rear final drive or differential units 16 and 30, respectively, through two propeller shafts 20 and 24. In the drive system shown, an internal combustion engine 64 is operatively connected to a front wheel drive transmission system 62. Front halfshaft assemblies 12 and 14 are operatively connected to transmission system 62. More specifically, transmission system 62 includes a front differential 16 as is known in the art which includes some means for receiving the plunging constant velocity joints 44 of the front halfshaft assemblies. Internal to the transmission 62, the front differential housing 63 is operatively connected to the power take-off unit 17. The power take-off unit 17 is further connected to a high speed fixed joint 18.

A high speed fixed joint 18 is connected at one end to the power take-off unit 17 and at the other end to a front propshaft 20. "VL" type plunging constant velocity joint 22 is similarly connected at one end to the rear propshaft 24 and at the other end to front propshaft 20. The high speed fixed joint may have a revolution-per-minute (RPM) capacity of 6000 RPMs with a preferable range of 3000–5000 RPMs, a torque capacity of 5–1500 Nm with a preferable capacity of 600–700 Nm, and an angle capacity of up to 15 degrees with a preferable capacity of 3–6 degrees. Of course, the drive system may use other constant velocity joints and/or cardan joints or universal joint technology at this connection. However, a high speed fixed joint is generally preferred.

High speed fixed joint 18 includes a boot 23 which is utilized to enclose grease (not shown) required for lubrication of the high speed fixed joint 18. The front propshaft 20 in the present invention is manufactured from steel providing a very low run-out and critical speed capacity higher than the second engine order. Front propshaft 20 is operatively connected to constant velocity joint 22 by fasteners 25. Front propshaft 20 has a flange 27 extending out which is connected to constant velocity joint 22 by fasteners 25. High speed fixed joint 18 similarly includes a flange 19 extending out which is connected to front propshaft 20 by fasteners.

As indicated above, propeller shafts ("propshafts") 26 and 28 function to transfer torque to the rear axle in rear wheel and all wheel drive vehicles. These propshafts are typically rigid in the axial direction and under certain circumstances, can contribute to the transfer of force down the fore-to-aft axis of the vehicle on impact, particularly in a frontal crash. Such transfer of energy can lead to high forces in the vehicle and thus high rates of acceleration for the occupants. Further, such energy can contribute to uncontrolled buckling of the propshaft itself resulting in damage to the passenger compartment or fuel tank from puncturing or the like. Still further, such energy creates excessive and undesirable vibrations, i.e noise, in the passenger compartment.

The present invention addresses and overcomes the aforementioned problems by providing an improved bracket for removably affixing a propeller shaft to a motor vehicle which permits the propeller shaft to tear from the vehicle in a controlled substantially downward direction during impact.

Figure 2:
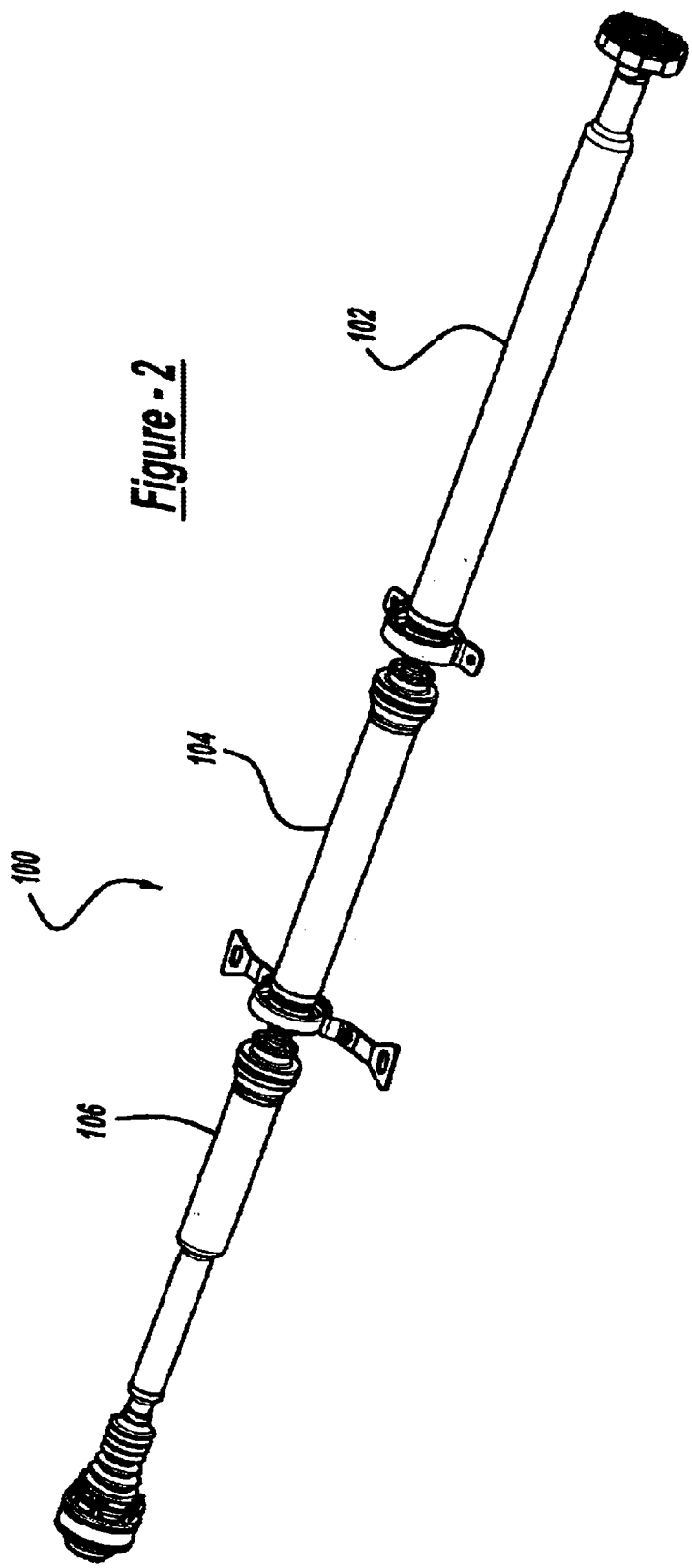
FIG. 2 is a perspective view of a propeller shaft assembly incorporating the crash optimized bracket of the present invention.
Figure 3:
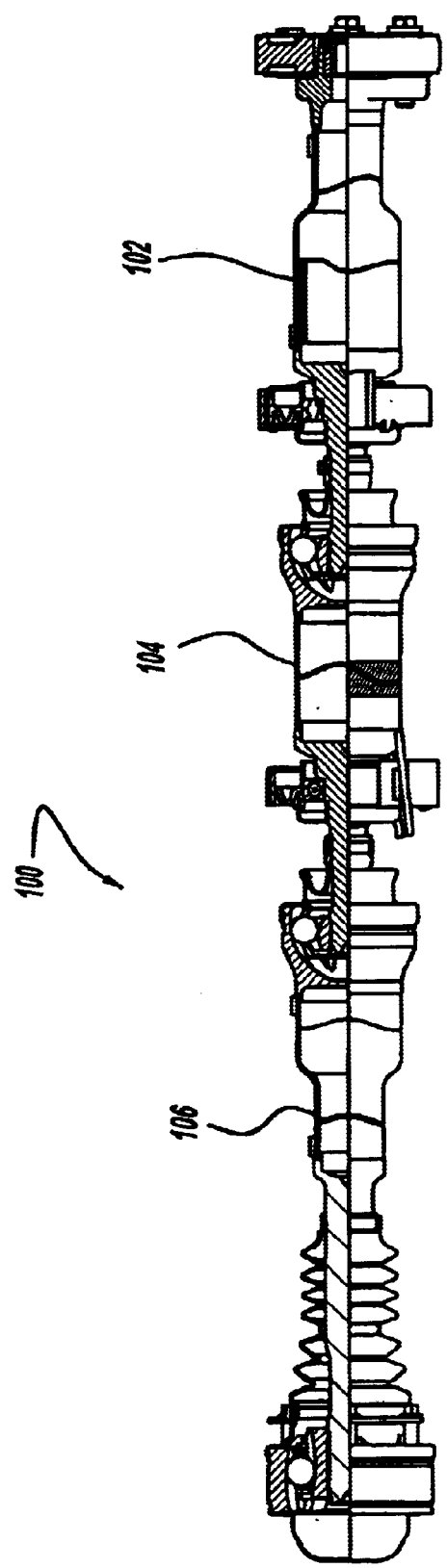
FIG. 3 is an enlarged partially cross sectional view of the propeller shaft assembly of FIGS. 1 and 2.
Figure 4:
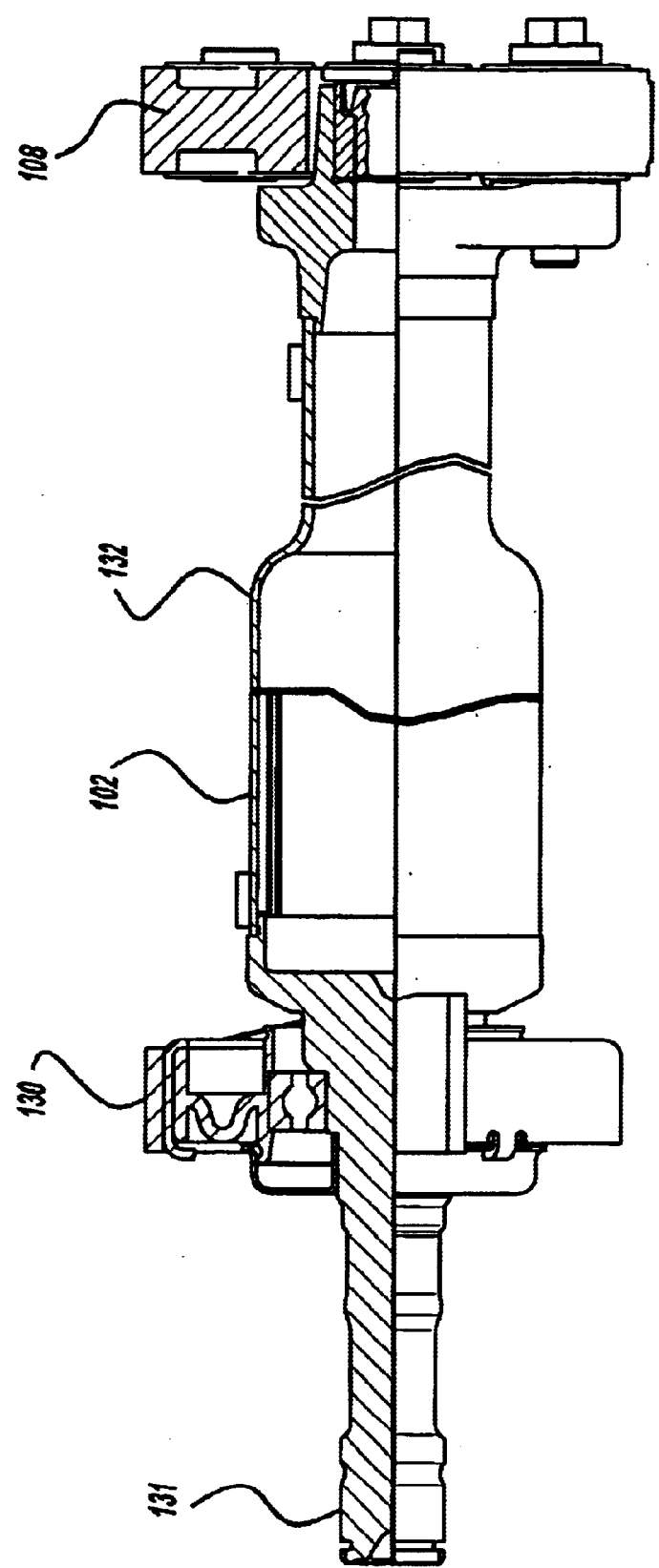
FIG. 4 is a perspective view of the rear section of the propeller shaft assembly of FIGS. 1–3.

Referring to FIGS. 2 and 3, there is shown a perspective view and an enlarged partially cross sectional view of a propeller shaft assembly suitable for use with the tear away bracket of the present invention. The assembly is designated generally by reference numeral 100 and includes a rear section 102, a center section 104, and a front section 106, respectively, each operatively connected to one another to transfer torque from a rear driveline module to power take-off unit 17. Assembly 100 is, of course, one suitable embodiment for the flexible coupling of the present invention. It is understood, however, that the coupling may be used in connection with any propeller shaft or propeller shaft assembly section, including, but not limited, to the assemblies shown and described herein.

As shown in further detail in FIGS. 4–10, rear propeller shaft section 102 comprises a retaining member 108 such as, for example, a flexible coupling for affixing the propeller section to a driveline module. Retaining member 108 may comprise, for example, an annular member having a plurality of recesses 110 disposed about a common axis 112. The annular member may further comprise a plurality of bosses 114 similarly disposed about the common axis and preferably, but not necessarily, further disposed coaxial with each of the recesses 110. In a preferred embodiment, bosses 114 may also be disposed about the common axis in a defined pattern such as, for example, coaxial with alternating recesses. Still further, bosses 114 may be arranged such that alternating recesses on each side of the annular member correspond to bosses on the opposite side and vice versa.

Figure 5:
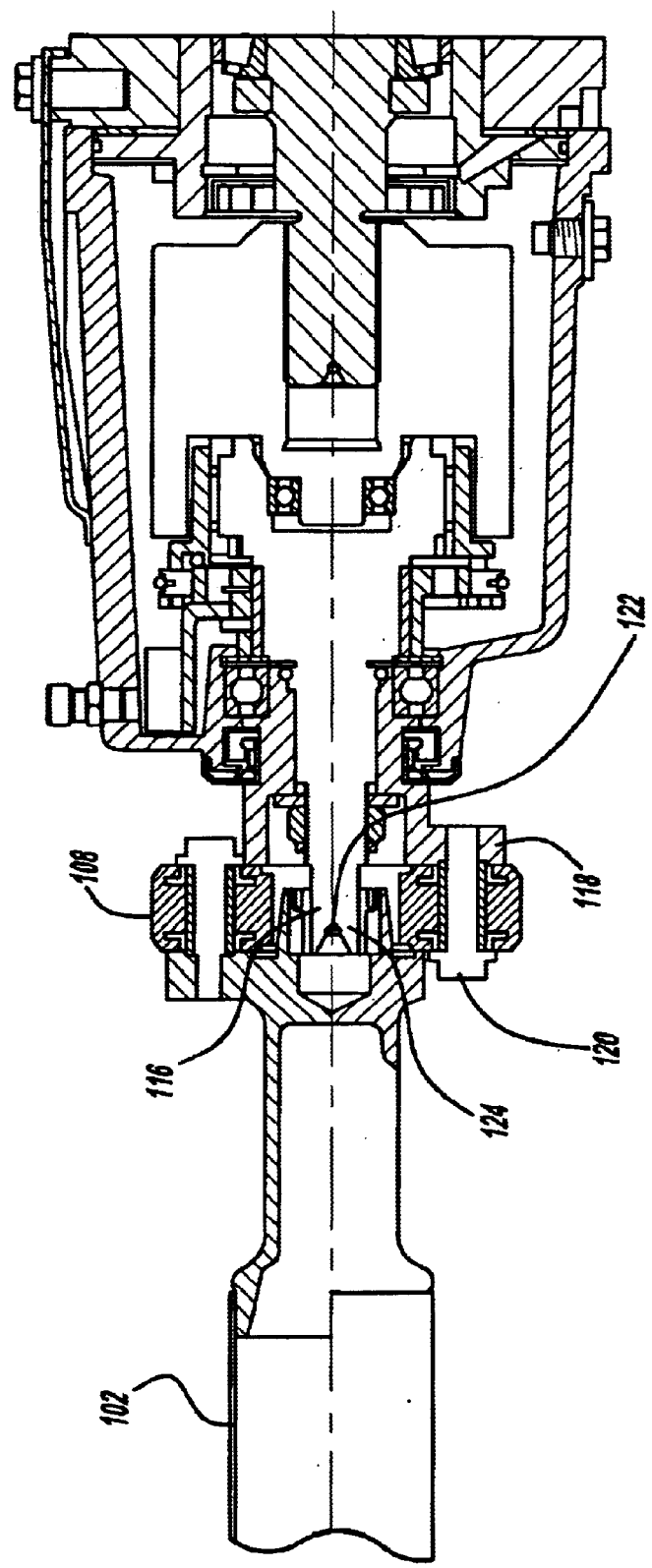
FIG. 5 is an enlarged partially cross sectional view of the rear section of a propeller shaft assembly shown affixed to a rear driveline module by a flexible coupling.
Figure 6:
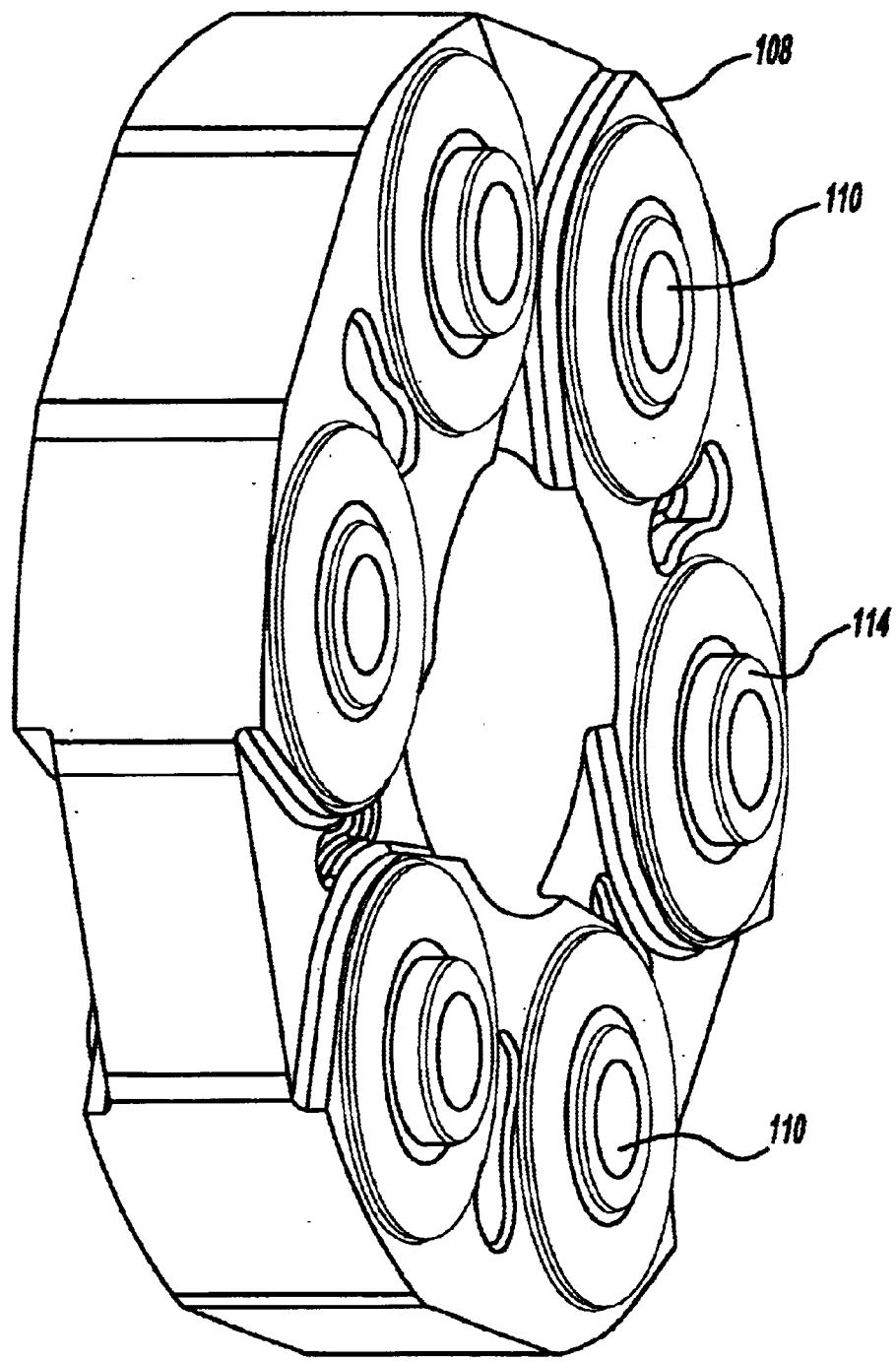
FIG. 6 is a perspective view of the flexible coupling of FIG. 5.
Figure 7:
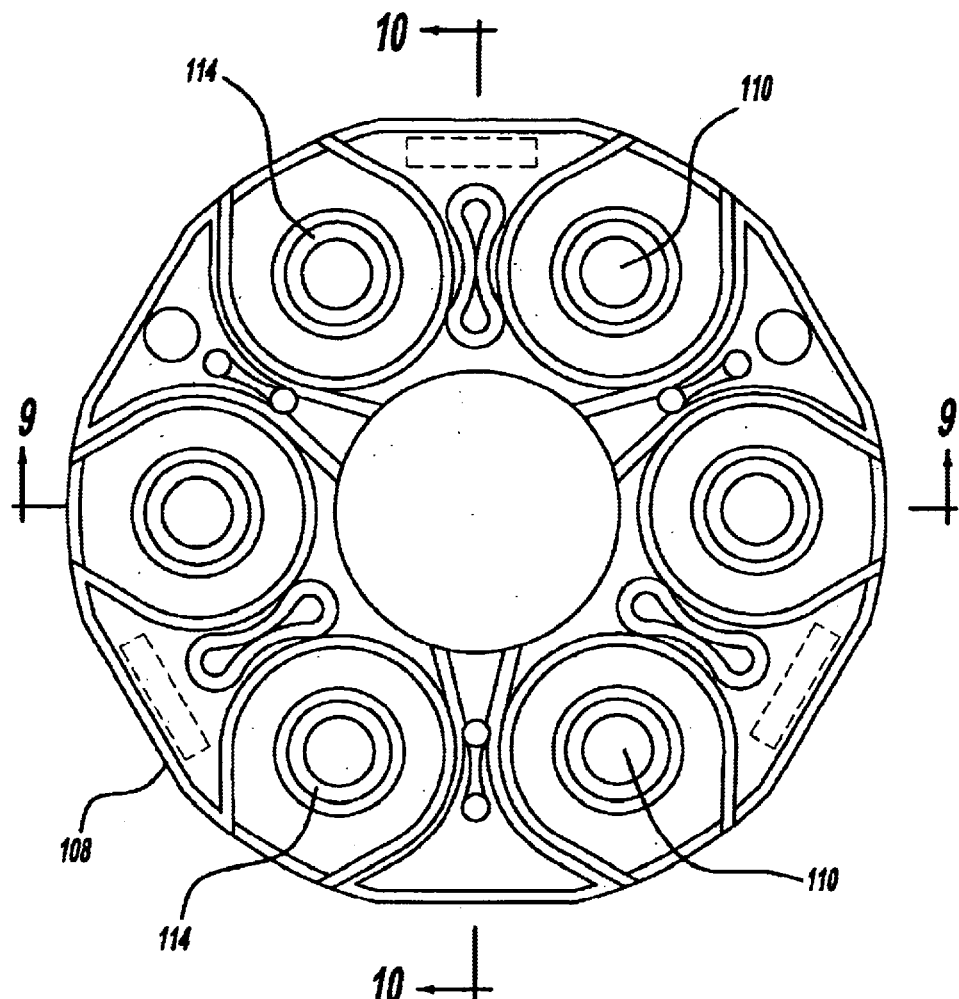
FIG. 7 is top plan view of the flexible coupling of FIG. 5, the bottom plan view being a mirror image thereof.
Figure 8:
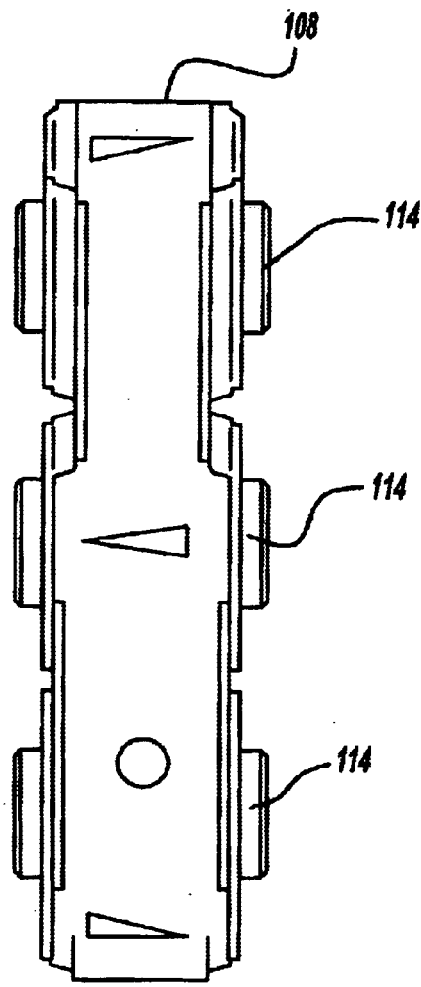
FIG. 8 is a right side elevational view of the flexible coupling of FIG. 5, the left side being a mirror image thereof.
Figure 10:
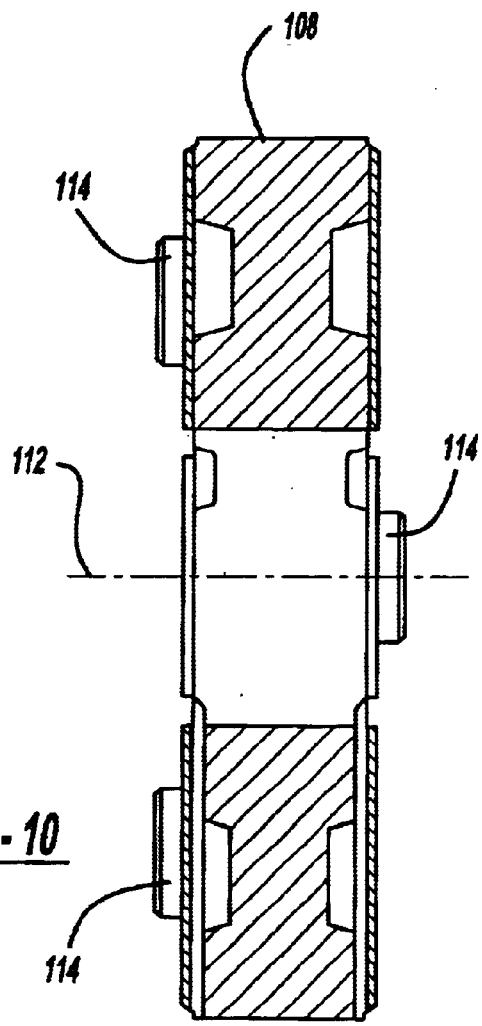
FIG. 10 is a cross sectional view of the flexible coupling of FIG. 7 through line B—B.
Figure 9:
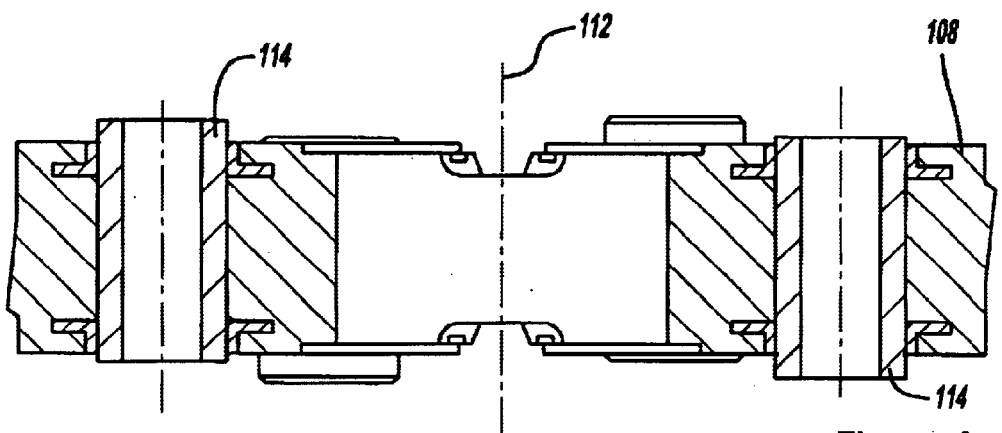
FIG. 9 is a cross sectional view of the flexible coupling of FIG. through line A—A.

Retaining member 108 further includes a retaining device 116 for connecting the coupling to a propeller shaft and a driveline module flange such as, for example, the rear driveline module flange 118 shown in FIG. 5. Retaining device 116 functions to prevent the propeller shaft, here rear propeller section 102, from decoupling from the vehicle in the event of a joint or fastener failure. More specifically, if bolts 120, for whatever reason, lose torque, the propeller shaft will be unable to decouple and drop because centering stub 122 of the driveline module is contained in a nest 124 of retaining device 116.

Retaining member 108 is typically, but not necessarily, comprised of a flexible material. However, it is understood and contemplated that any suitable material may be used depending on the application including without limitation, rubber, plastic, ceramic, metal, metal alloys, and combinations thereof. Further, while shown incorporated herein to couple a rear propeller section of a propeller assembly to a rear driveline module, member 108 may be used in any suitable application. Again, it is therefore contemplated that retaining member 108 may be used in other propeller shaft assemblies and parts or sections thereof, including, without limitation, prior art assemblies of the type disclosed in FIGS. 1 and 2.

The use of such a coupling, especially in the rear of the vehicle, has several benefits. At the threshold, it decouples vibrations in the system. Moreover, it acts as a self retaining feature for constraining the rear of the propeller shaft in case of a joint failure. The use of a flexible coupling, in particular, is an effective an economical way to stop the transmission of vibration from the rear module to the propeller shaft section 102 while still being able to absorb small angle variations between the axle and the propeller shaft. This allows the noise and vibration generated in the rear differential and over-running clutch to be isolated from the passengers in the vehicle.

Figure 11:
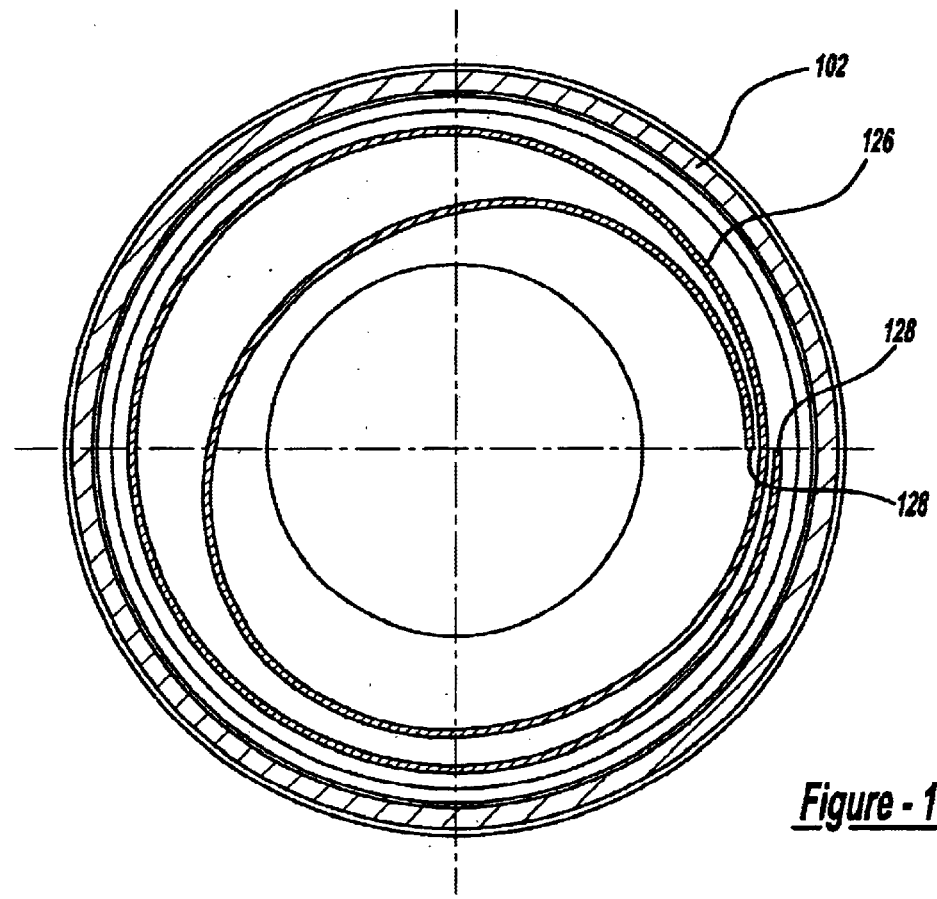
FIG. 11 is an enlarged partially cross sectional view of the internal self dampening means incorporated in the rear propeller shaft section of FIGS. 1–5.
Figure 12:
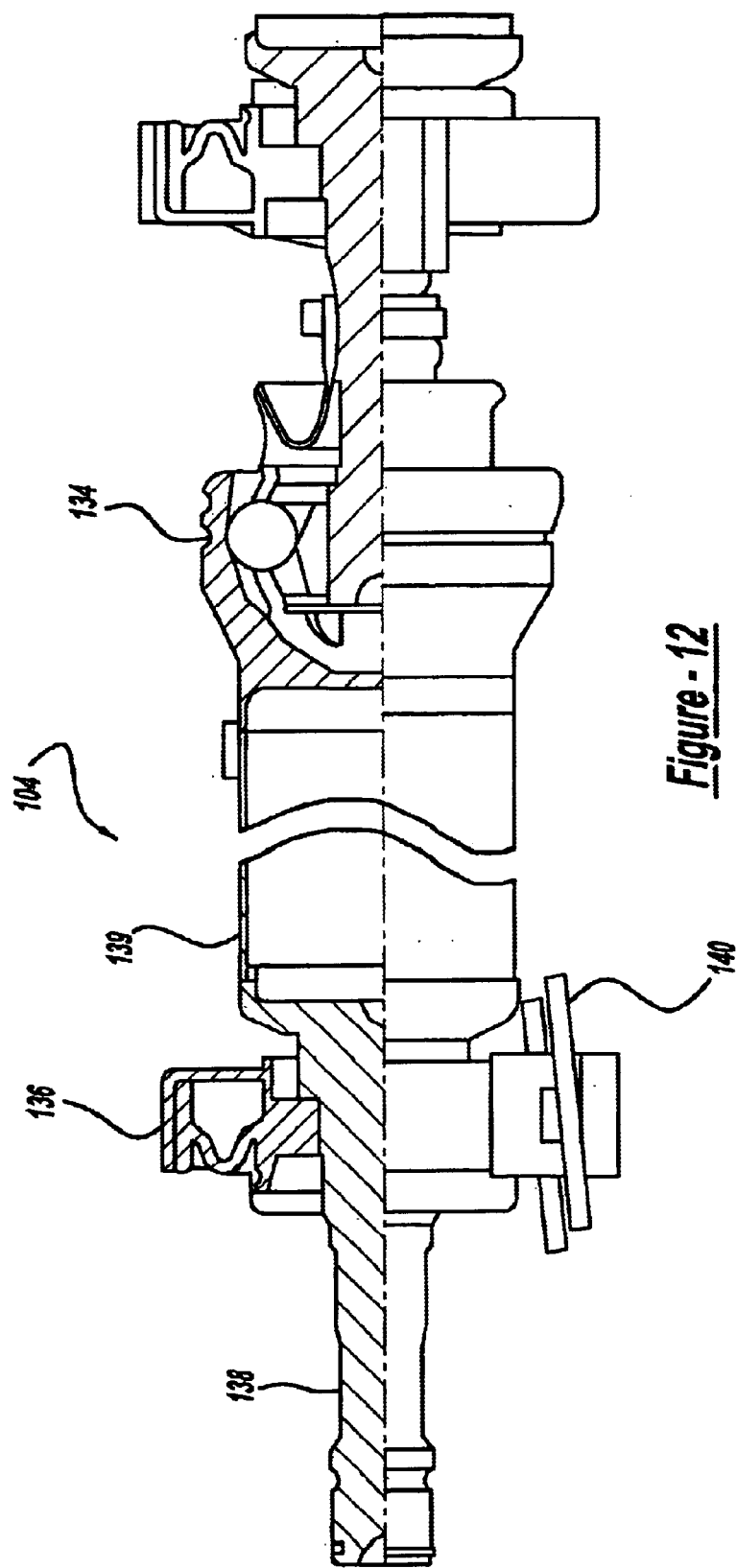
FIG. 12 is a perspective view of the center section of the propeller shaft assembly of FIGS. 1–3.
Figure 13:
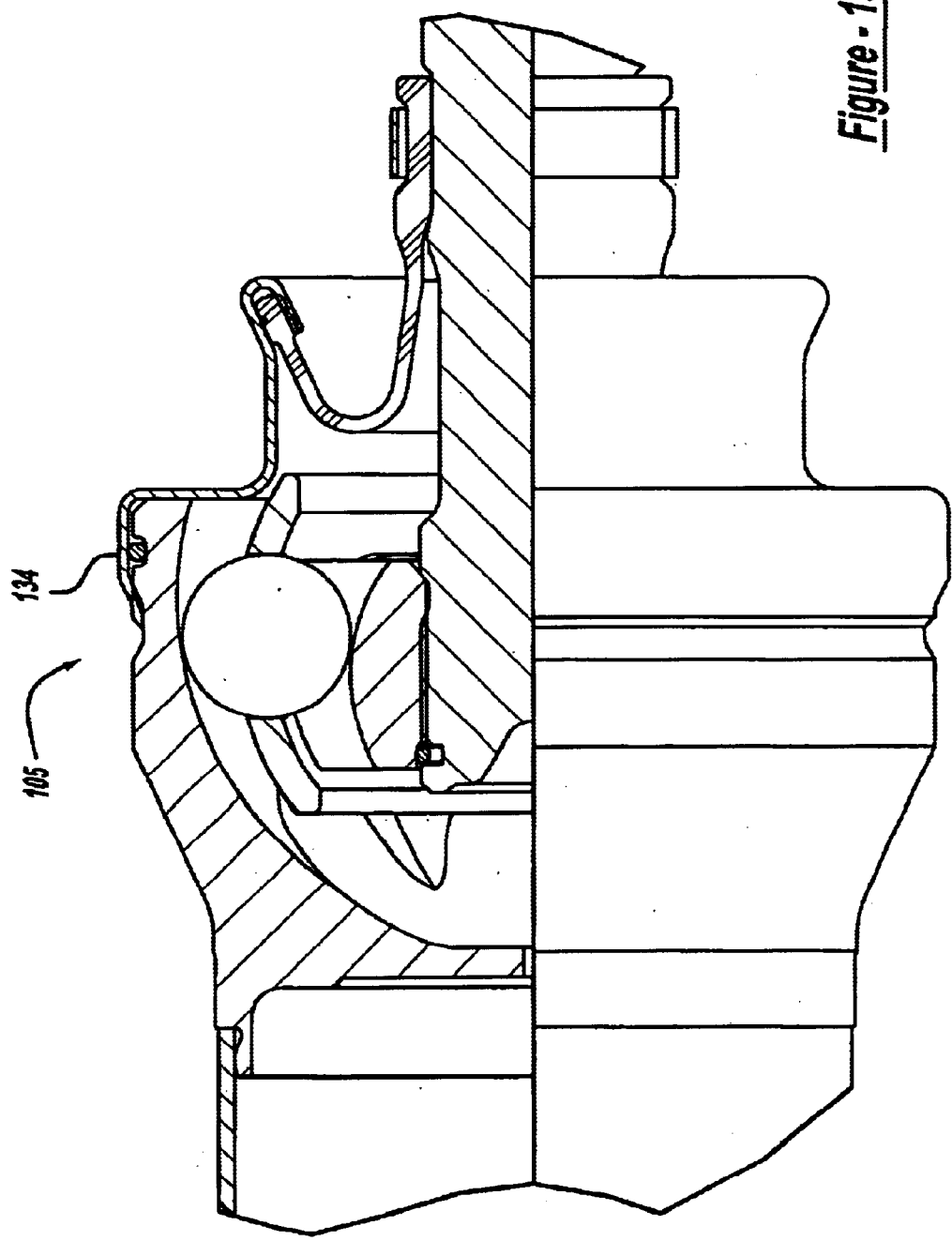
FIG. 13 is an enlarged partially cross sectional view of the Mono-Block High Speed Fixed Joint incorporated in the center section of the propeller shaft assembly of FIGS. 1–3.
Figure 14:
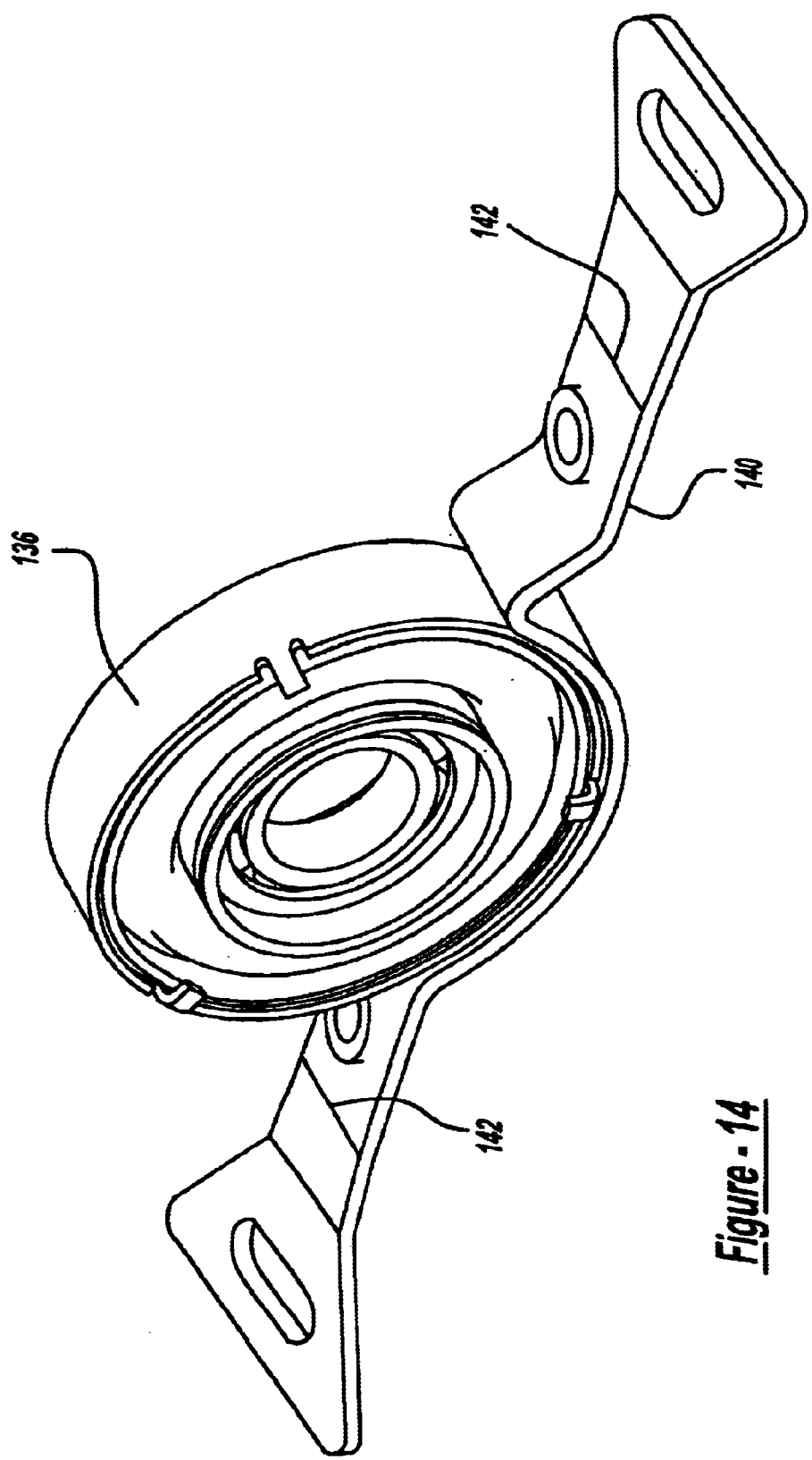
FIG. 14 is a perspective view of the crash optimized bracket of the present invention shown affixable to the center section of the propeller shaft assembly of FIGS. 1–3.
Figure 15:
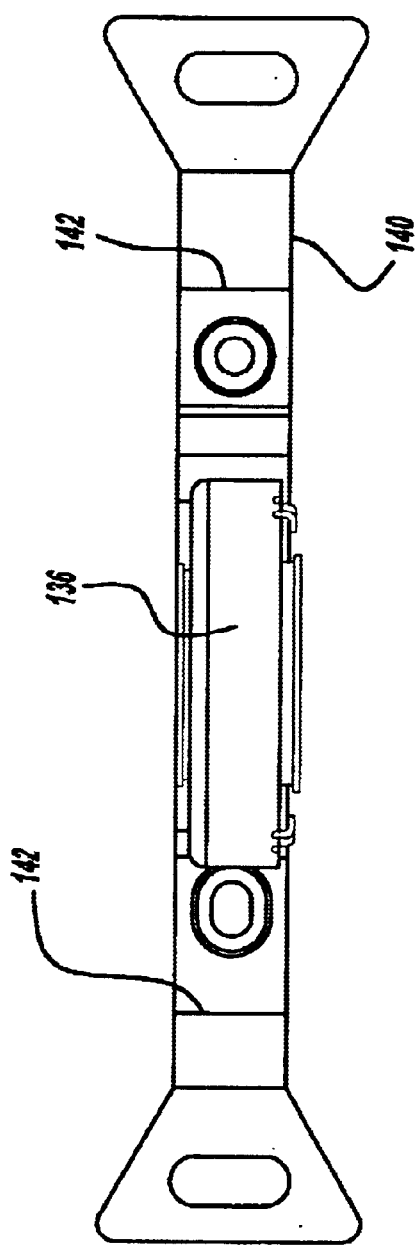
FIG. 15 is a top plan view of the crash optimized bracket of FIG. 14.
Figure 16:
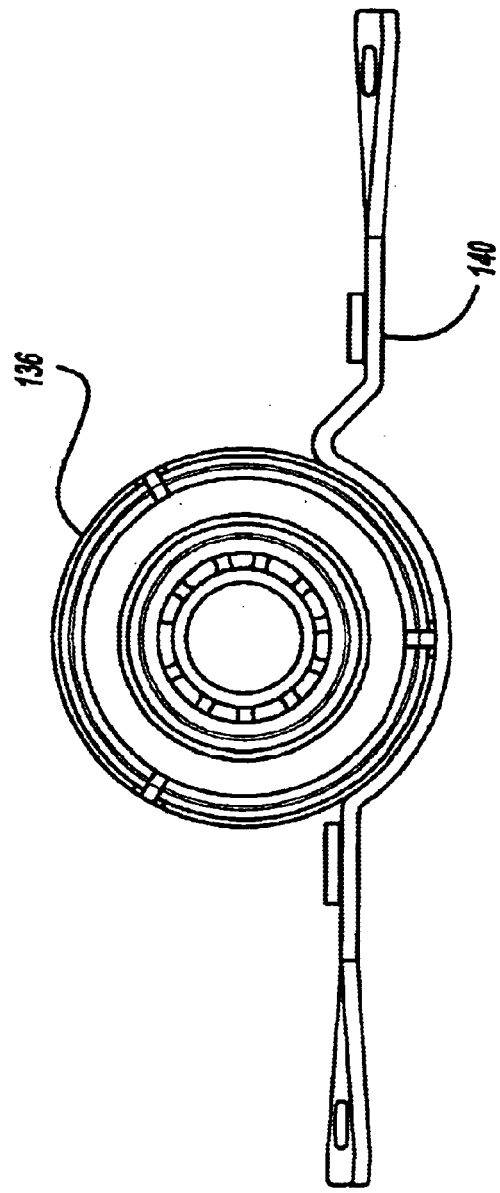
FIG. 16 is a front elevational view of the crash optimized bracket of FIG. 14.
Figure 17:
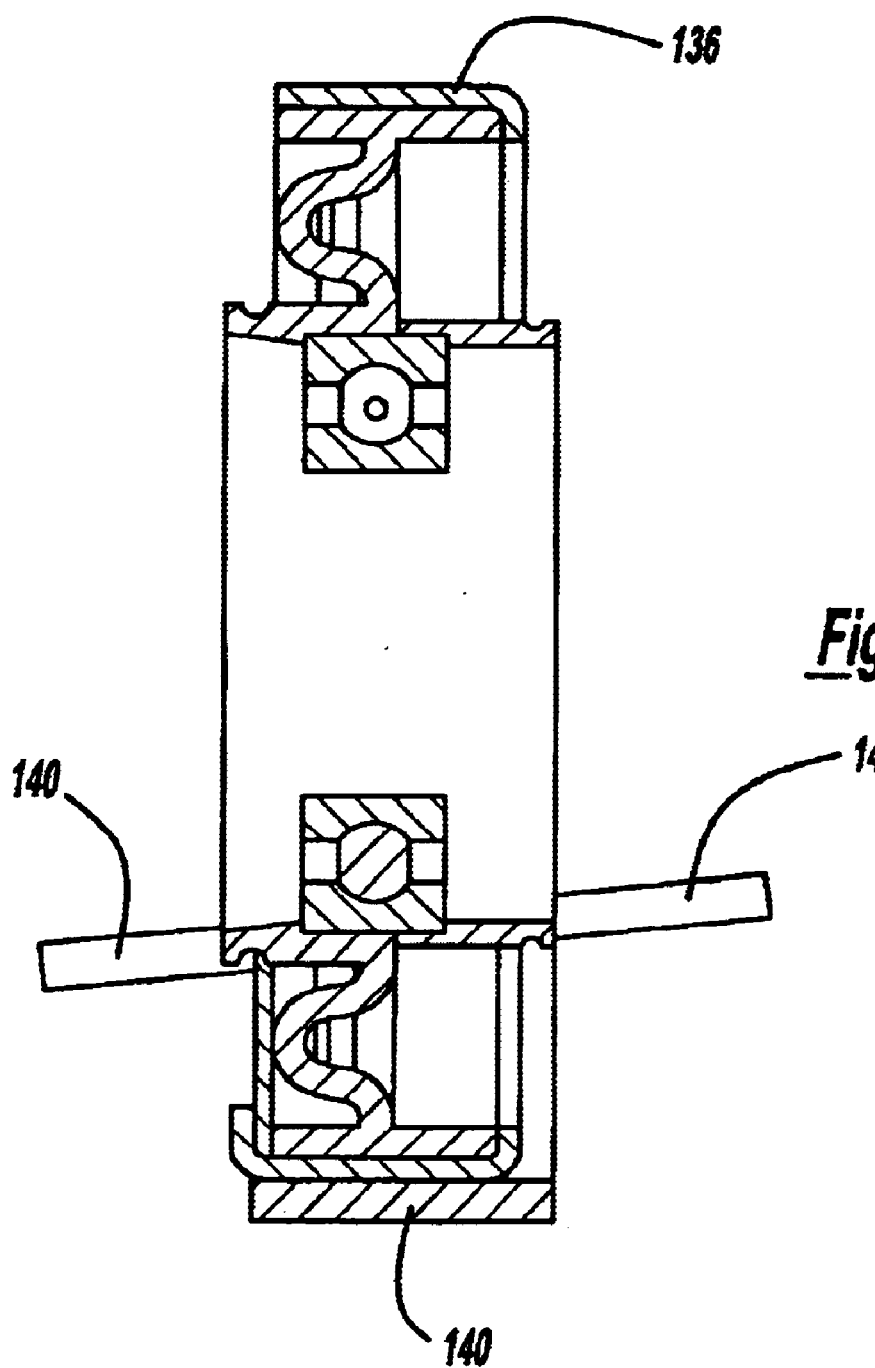
FIG. 17 is a cross sectional view of the crash optimized bracket of FIG. 14 through line A—A.
Figure 18:
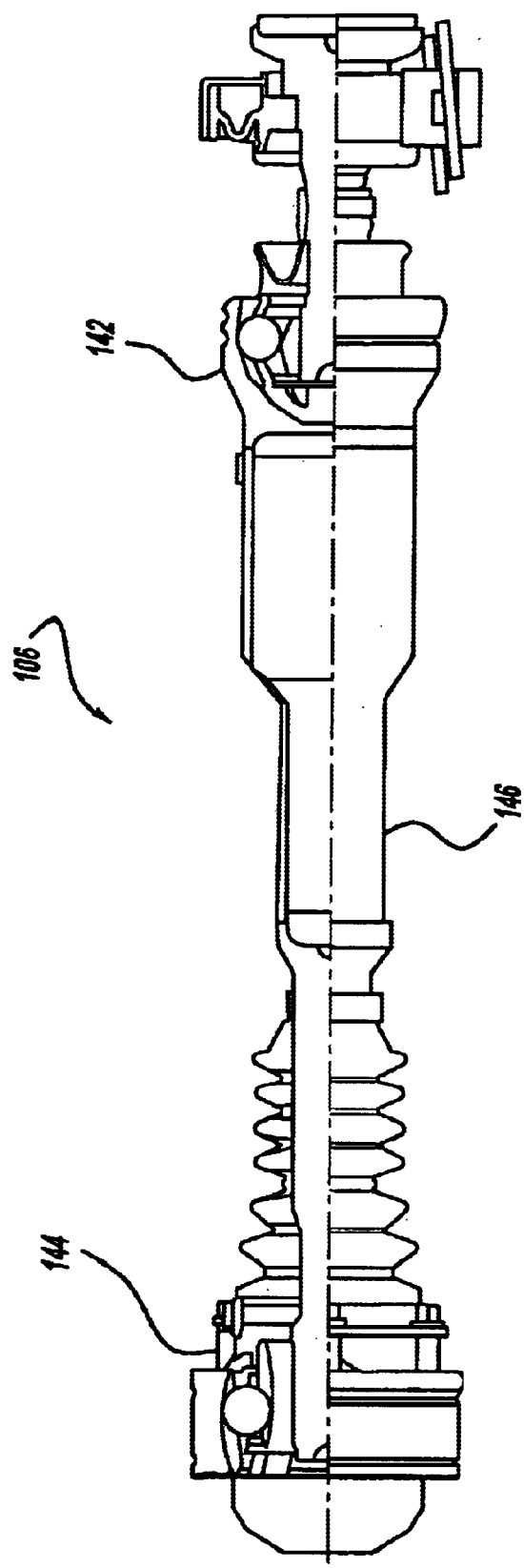
FIG. 18 is a perspective view of the front section of the propeller shaft assembly of FIGS. 1–3.
Figure 19:
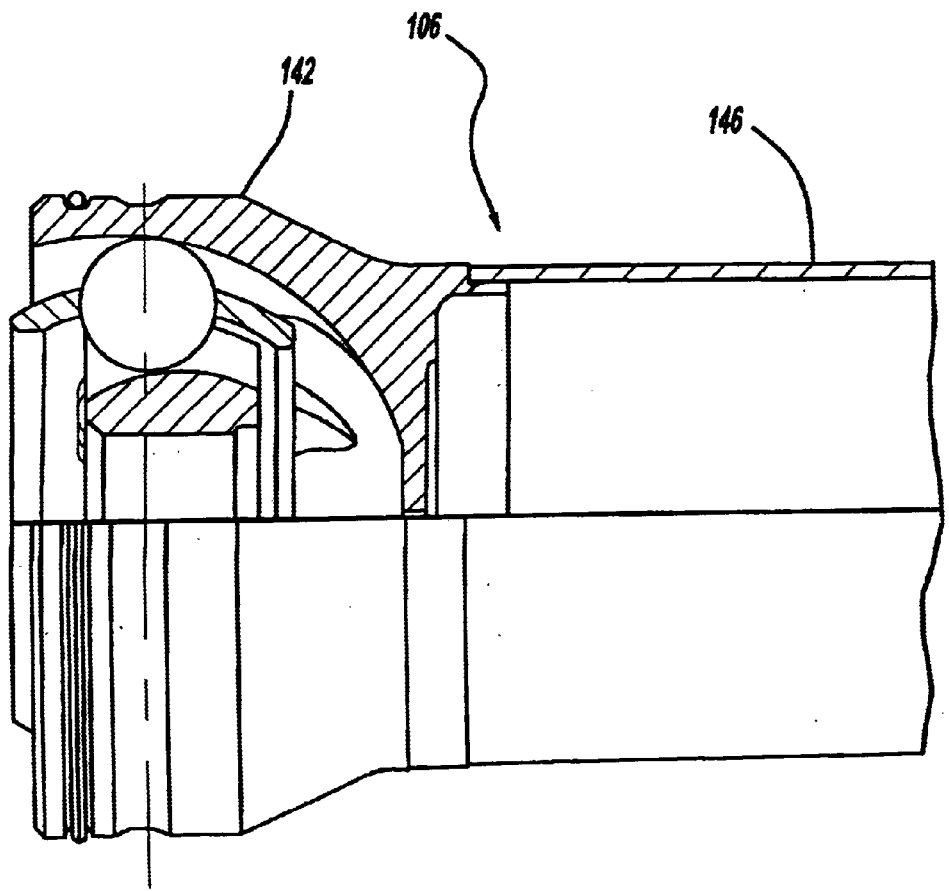
FIG. 19 is an enlarged partially cross sectional view of a Mon-Block High Speed Fixed Joint of the front section of the propeller shaft assembly of FIG. 18.
Figure 20:
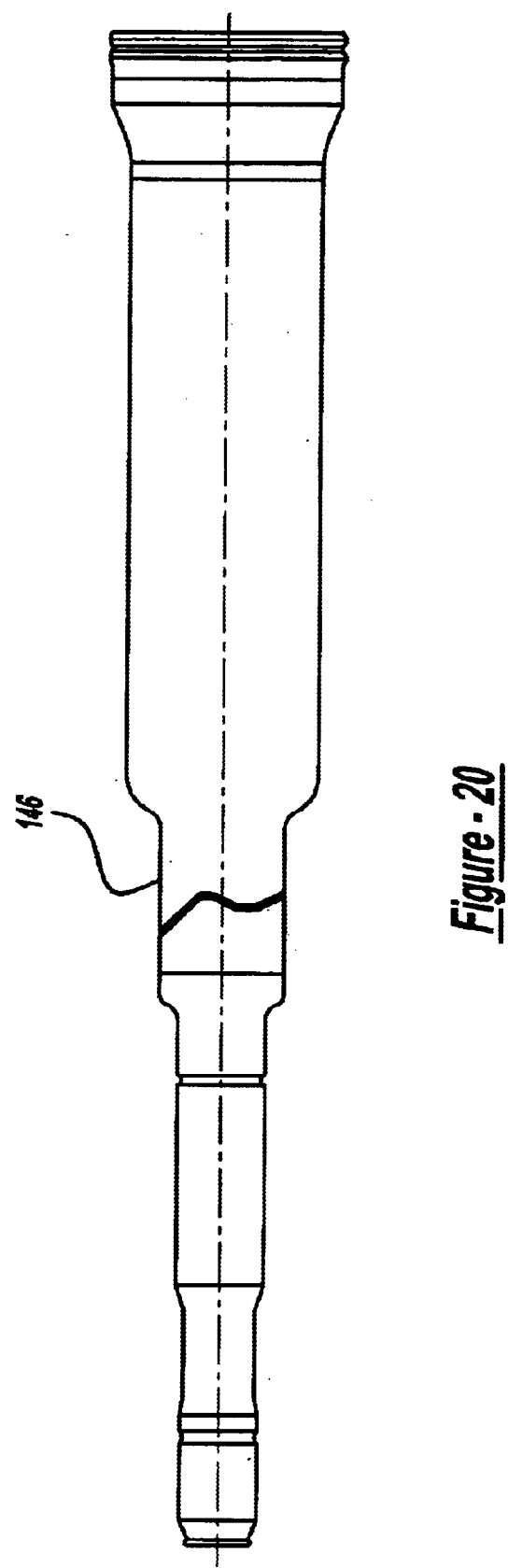
FIG. 20 is a top plan view of the swaged portion of the front section of the propeller shaft assembly of FIGS. 1–3.
Figure 21:
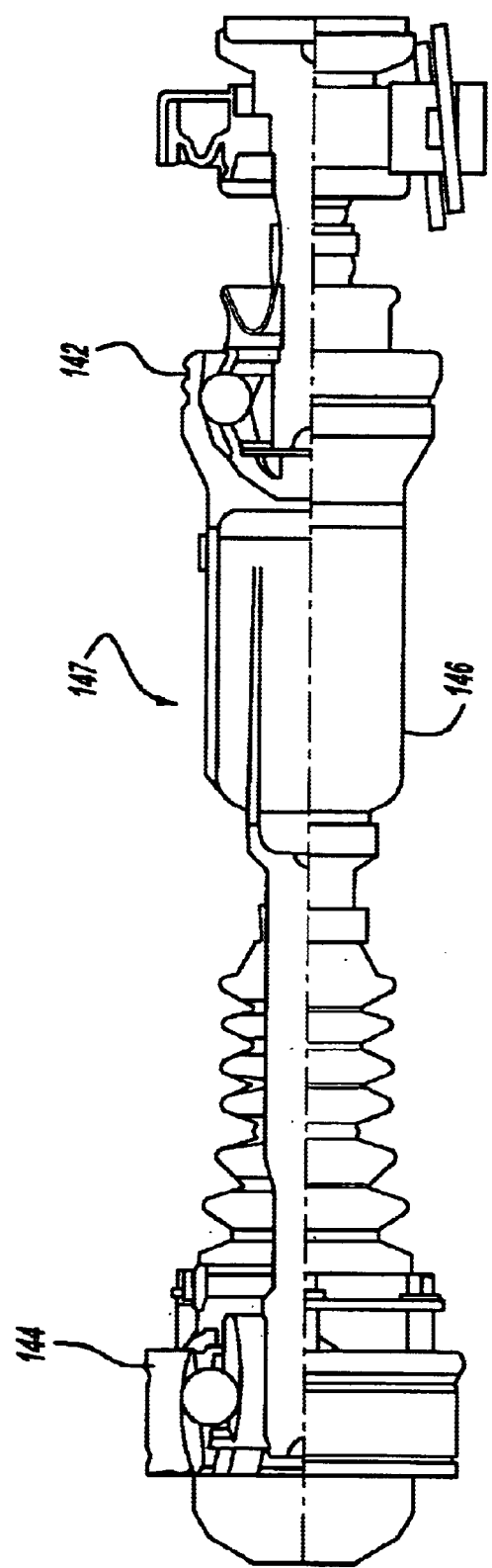
FIG. 21 is a perspective view of the front section of the propeller shaft of FIGS. 1–3 shown in a collapsed position following impact.
Figure 22:
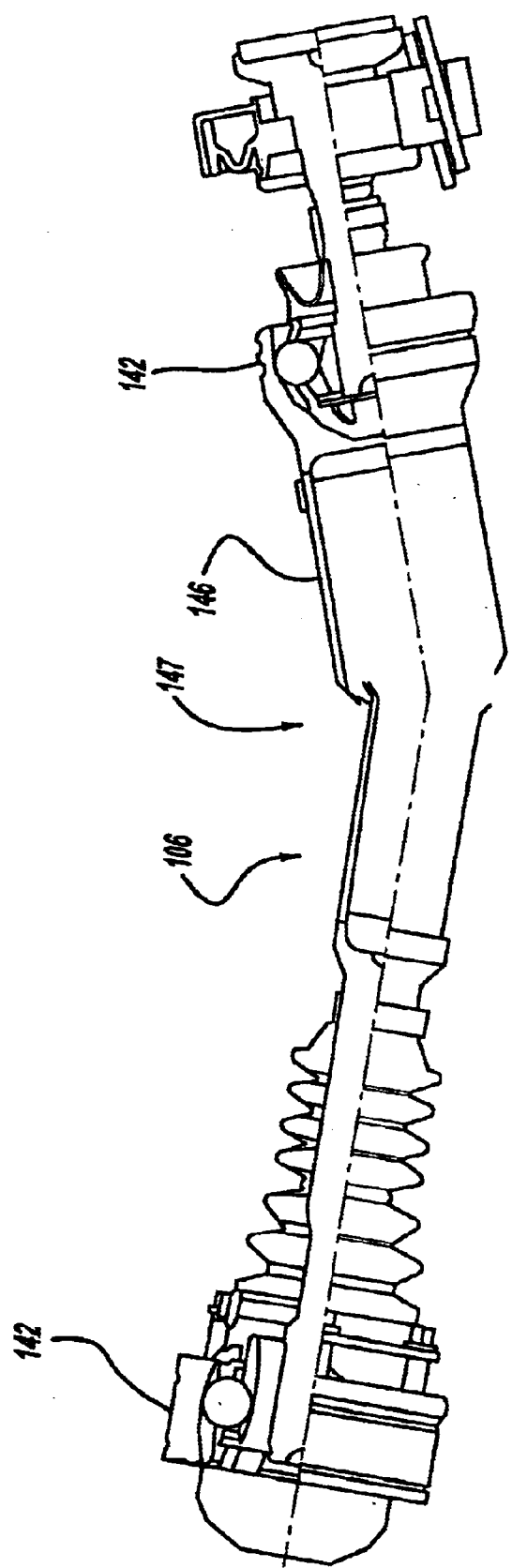
FIG. 22 is a perspective view of the front section of the propeller shaft of FIGS. 1–3 shown in a buckled position following impact.

Turning now to FIG. 11 of the drawings, there is shown an enlarged partial cross sectional view of rear propeller section 102. In keeping with the invention, rear propeller section includes an internal self dampening means 126 to absorb vibrational energy caused by rotation of the propeller shaft section 102. Dampening means 126 may comprise any suitable material such as, for example, foam, plastic, cardboard etc. In the preferred embodiment shown, dampening means 126 comprises a heat resistant material such as conventional cardboard rolled in a direction opposite the direction of rotation of the propeller shaft so as to provide maximum energy absorbtion. Specifically, rotation of propeller shaft 102 causes the cardboard to unwrap. As further shown in FIG. 11, the cardboard is rolled at least twice with the ends 128 substantially aligned with a common radius.

Again, while dampening means 126 is shown inserted in rear propeller shaft section 102, it may be used in any or all of the propeller shaft sections 102, 104 or 106 as well as any other rotary shaft, including, but not limited to prior art shafts 20 and 24 of FIGS. 1 and 23 where it may desirable to absorb rotational energy as well as noise generated by the rear axle and/or clutch.

Referring again to FIG. 4, rear propeller shaft section 102 further includes a center bearing 130 coupled to retaining member 108 by a coupling member 132. In a preferred embodiment, coupling member 132 is swaged to allow for tool clearance to install the retaining member 108 into the motor vehicle. That is, it has a variable diameter across its length to connect ends of disparate diameters. The length is further tuned to allow this clearance but prevent buckling. As shown, the length of the rear section coupling member 132 is preferably, but not necessarily, significantly shorter than the length of front section coupling member as disclosed below. Of course, any suitable length by be used depending on the specific application. Moreover, any or all of the propeller shaft sections 102, 104 or 106 may incorporate a swaged coupling member. Still further, any rotary shaft, including, but not limited to the above described propeller shaft sections as well as prior art propshafts 126 and 128 may incorporated swaged couplings so as to create a stress concentration zone to allow the coupling to buckle or collapse within itself in response to predetermined loads.

As seen, rear propeller shaft section 102 thus comprises a flexible coupling 108 and a stub shaft 131 supported by a Center Bearing Bracket 130 affixable to the motor vehicle and, more particularly, a cross member. Rear section 102, which runs under the motor vehicle fuel tank, has no constant velocity joints on its length and is firmly supported at both ends. Making this section free of joints allows it to be relatively free of stress concentrations and further secures it firmly in place preventing buckling or flailing under the vehicle during a crash and damaging the fuel tank.

Turning now to FIGS. 12–17, the center propeller shaft section 104 will be described in greater detail. As shown, center section 105 comprises a MonoBlock High Speed Fixed Joint 134 for removably affixing the center section to the rear section 102. As those skilled in the art will recognize, a Mono-Block High Speed Fixed Joint is a type of fixed constant velocity joint wherein the outer joint part is a bell shaped member having a closed end.

Center section 104 further comprises a center bearing 136 for supporting a stub shaft 138. Center bearing 136 is further connected to a coupling member 138. In keeping with the invention, center section further includes a crash optimized bracket 140 for removably coupling center bearing 136 to the motor vehicle. Bracket 140 comprises an elongated member having a plurality of score lines or weakened slots 142 preferably, but not necessarily, disposed vertically in a direction perpendicular to the length of the bracket. In a preferred embodiment, slots 142 are disposed in predetermined locations with predetermined weaknesses so as to allow bracket 140 to tear in a predictable and controlled manner in a generally downward direction upon impact. Such placement, arrangement, and weakness setting permits the bracket and thus the corresponding propeller shaft or propeller shaft section to be tuned to respond to predetermined loads.

In a preferred embodiment, bracket 140 comprises a generally elongated member having a variable thickness across its length. The elongated member is preferably made of a metal but may be made of plastic or ceramic. As shown, the thickness may be greater in the middle and substantially thinner at each end. In another contemplated embodiment the elongated member has a greater thickness at its ends then at the center thereof. It is understood, however, that any suitable shape, length or thickness may be utilized depending upon the particular application. Moreover, bracket 140 may be used with any or all rotary shafts including, but not limited to, the propeller shafts 126 and 128 and propeller shaft sections 102, 104, and 106 disclosed herein.

Referring now to FIGS. 18–22 of the drawings, there is shown in greater detail the front propeller shaft section 106 of the propeller shaft assembly 100. Section 106 comprises a Mono-Block High Speed Fixed Joint 142 and a Plunging Type VL Constant Velocity Joint 144 connected by a swaged tube 146. Plunging Joint 144 functions to allow the engine 62 and the power take-off unit 17 to move without causing tube 146 move and to further allow engine 62 to move backward in the first moments of impact. As a result, reduced force is transferred, if at all, down the length of the propeller shaft during impact, particularly, frontal impact.

Tube 146 has a specially designed transition between its ends which have disparate diameters (large and small). This transition is designed to create a stress concentration zone 147 which allows the tube 146 to either collapse into itself or buckle as shown if FIGS. 21 and 22. Used either as a buckling point or a collapse feature, this zone enhances the propeller shaft's ability to absorb energy and minimize the resultant force of the shaft on impact.

In summary, the flow of parts from front to rear of the propeller shaft assembly is the power take-off unit 17 to the VL style plunging joint 144 to the front propeller shaft section 106. Section 106 contains the swaged tube 146 which is affixable to a constant velocity fixed joint such as, for example, a monoblock high speed fixed joint 142. Interfacing with the monoblock high speed fixed joint 142 is the center propeller shaft section 104. On the forward side of the center section 104 is a stubshaft 138 that interfaces with the monoblock high speed fixed joint 142 of the front propeller shaft section 106. Stubshaft 138 is also used to locate the center bearing 136 and bracket assembly 140. Affixed to the stubshaft 138 (preferably, but not necessarily by welding) is a tube 139 of substantially uniform cross section. Affixable to tube 139 is yet another constant velocity fixed joint such as, for example, a monoblock high speed fixed joint 134. Interfacing with the monoblock high speed fixed joint 134 is the stubshaft of the rear propeller shaft section 108. Again, as in the center section 104, the rear stubshaft locates the denter bearing and bracket. The stubshaft is affixable to a swaged tube at its rear end to allow for tool clearance. Further affixed to the tube is a three arm coupling which is bolted to a flexible coupling which, in turn, may interface with a speed sensing torque device.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use in a driveline of a motor vehicle, a crash optimized bracket for removably affixing a propeller shaft to the vehicle, comprising:
   an elongated member having a plurality of weakened slots to allow the bracket and the propeller shaft to tear from the vehicle in a substantially downward direction during impact, the slots are disposed substantially vertically across the length of the elongated member.

2. A crash optimized bracket as in claim 1, wherein the slots are disposed at predetermined locations and weakened to predetermined levels to permit the propeller shaft to be tuned to tear off from the vehicle in response to predetermined loads.

3. A crash optimized bracket as in claim 1, wherein the elongated member has a variable thickness across its length.

4. A crash optimized bracket as in claim 1, wherein the elongated member has a greater thickness at its ends that in its center.

5. A crash optimized bracket as in claim 1, wherein the elongated member is comprised of metal.

6. A crash optimized bracket as in claim 1, wherein the elongated member is comprised of plastic.

7. A crash optimized bracket as in claim 1, wherein the elongated member is comprised of ceramic.

8. A crash optimized bracket as in claim 1, wherein each of the slots of the elongated member are independently tunable.

9. For use a driveline of a motor vehicle, a crash optimized bracket for removably affixing a propeller shaft to the vehicle, comprising:
   an elongated member affixable to a center bearing, the member having:
   a variable thickness across its length; and
   a plurality of weakened slots disposed substantially vertically along its length, the slots disposed at predetermined locations and weakened to predetermined levels to permit the propeller shaft to be tuned such that the bracket and the propeller shaft will tear from the vehicle in a substantially downward direction during impact at predetermined loads.

* * * * *